United States Patent
Yamamoto et al.

(10) Patent No.: US 8,089,602 B2
(45) Date of Patent: Jan. 3, 2012

(54) DISPLAY DEVICE WITH SPACERS HAVING DIFFERENT HEIGHTS AND NUMBERS

(75) Inventors: Takashi Yamamoto, Chiba (JP); Yoshihiro Arai, Mobara (JP); Aki Tsuchiya, Mobara (JP); Naoki Kikuchi, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 527 days.

(21) Appl. No.: 12/369,800

(22) Filed: Feb. 12, 2009

(65) Prior Publication Data
US 2009/0207371 A1    Aug. 20, 2009

(30) Foreign Application Priority Data
Feb. 14, 2008    (JP) ................... 2008-032564

(51) Int. Cl.
G02F 1/1339    (2006.01)
(52) U.S. Cl. ........................ 349/155; 349/156
(58) Field of Classification Search ........... 349/155–156
See application file for complete search history.

(56) References Cited

U.S. PATENT DOCUMENTS

| | | | | |
|---|---|---|---|---|
| 7,355,667 B2 * | 4/2008 | Yanagawa | ..................... | 349/153 |
| 7,630,051 B2 * | 12/2009 | Lee | .................. | 349/155 |
| 2004/0114087 A1 * | 6/2004 | Cho et al. | ...................... | 349/155 |
| 2006/0152668 A1 * | 7/2006 | Jang et al. | ..................... | 349/156 |
| 2007/0058126 A1 * | 3/2007 | Cho et al. | ...................... | 349/156 |
| 2007/0103635 A1 * | 5/2007 | Tawaraya et al. | ............ | 349/156 |

FOREIGN PATENT DOCUMENTS
JP    2007-171716    7/2007

* cited by examiner

*Primary Examiner* — Hoan C Nguyen
(74) *Attorney, Agent, or Firm* — Antonelli, Terry, Stout & Kraus, LLP.

(57) ABSTRACT

The generation of bubbles in a liquid crystal material of a liquid crystal display panel and the generation of color irregularities when the liquid crystal display panel is pushed can be reduced. In a display device having a liquid crystal display panel in which a liquid crystal material is filled between a first substrate and a second substrate, the second substrate forms, on a surface of an insulation substrate which faces the first substrate, first columnar members, second columnar members and third columnar members which differ from each other in a distance from the surface of the insulation substrate to a top portion of each columnar member. Assuming the distance of the first columnar member as L1, the distance of the second columnar member as L2 and the distance of the third columnar member as L3, a relationship among the distances L1, L3, L2 satisfies L1>L3>L2, and assuming the number of the first columnar members arranged on the surface of the insulation substrate as N1, the number of the second columnar members arranged on the surface of the insulation substrate as N2 and the number of the third columnar members arranged on the surface of the insulation substrate as N3, a relationship among the numbers N1, N2, N3 satisfies N2>N1>N3.

6 Claims, 8 Drawing Sheets

DISPLAY DEVICE WITH SPACERS HAVING DIFFERENT HEIGHTS AND NUMBERS

CLAIM OF PRIORITY

The present application claims priority from Japanese application serial No. 2008-32564, filed on Feb. 14, 2008, the content of which is hereby incorporated by reference into this application.

BACKGROUND OF THE INVENTION

1. Field of the Invention

The present invention relates to a display device, and more particularly to a technique which is effectively applicable to a liquid crystal display device manufactured by a liquid-crystal dropping filling method.

2. Description of the Related Art

Conventionally, the TFT-type liquid crystal display device has been used as a display of portable electronic equipment such as a mobile phone terminal, an external display of a television receiver set or a personal computer (PC) and the like.

The TFT-type liquid crystal display device is a display device which includes a TFT-type liquid crystal display panel in which a liquid crystal material is filled between a pair of substrates. Here, the pair of substrates is adhered to each other using an annular sealing material (adhesive material), and the liquid crystal material is hermetically filled in a space defined by the pair of substrates and the sealing material.

Here, one of the above-mentioned pair of substrates is a substrate which is constituted by forming a plurality of scanning signal lines, a plurality of video signal lines, a plurality of TFT elements, a plurality of pixel electrodes, an alignment film and the like on a surface of an insulation substrate, and is generally referred to as a TFT substrate. Further, the other of the above-mentioned pair of substrates is a substrate which is constituted by forming, for example, a light blocking film (also referred to as a black matrix), color filters, a leveling film, a plurality of columnar members, an alignment film and the like on a surface of an insulation substrate, and is generally referred to as a counter substrate.

The plurality of columnar members formed on the counter substrate is basically provided for making a thickness of a liquid crystal material (cell gap) in respective pixels of the TFT-type liquid crystal display panel uniform and hence, conventionally, all columnar members are formed with the same height, that is, distances from a surface of the insulation substrate of the counter substrate to top portions of all columnar members have the same value.

On the other hand, with respect to the above-mentioned TFT-type liquid crystal display panel, for example, when a quantity of the liquid crystal material which is hermetically filled in the liquid crystal display panel is smaller than a predetermined quantity or when the liquid crystal material shrinks in a low-temperature environment, the TFT substrate and the counter substrate are deformed in the direction that the cell gap is decreased. Here, when the number of the columnar members is large, the deformation of the TFT substrate and the counter substrate is suppressed and hence, a negative pressure in the inside of the liquid crystal material is increased. Accordingly, in the conventional general TFT-type liquid crystal display panel, for example, bubbles may be generated in the liquid crystal material due to an impact which is generated when the TFT substrate and the counter substrate returns to an original state from a deformed state.

Accordingly, with respect to the TFT-type liquid crystal display panel, recently, for example, there has been proposed a method which can maintain a uniform cell gap by providing first columnar members and second columnar members which differ from each other in height on a counter substrate and, at the same time, can prevent the generation of bubbles in a liquid crystal material (see JP-A-2007-171716 (patent document 1), for example). Here, the second columnar members are formed lower than the first columnar members.

SUMMARY OF THE INVENTION

In manufacturing the counter substrate, for example, first of all, the light blocking film and the color filters are formed on a surface of the insulation substrate, and a leveling film is formed on the light blocking film and the color filters. Then, for example, the first columnar members and the second columnar members are formed on the leveling film and, subsequently, the alignment film is formed on the leveling film. Further, there may be a case that the alignment film is formed on the leveling film and, thereafter, the first columnar members and the second columnar members are formed on the alignment film.

In this manner, in forming the first columnar members and the second columnar members on the leveling film or the alignment film, to take productivity of the counter substrates into consideration, it is desirable to simultaneously form the first columnar members and the second columnar members by exposing and developing one photosensitive material film.

In such constitution, the second columnar members also have, besides a function of preventing the generation of bubbles in the liquid crystal material, a function of preventing color irregularities when the TFT-type liquid crystal display panel is pushed from the counter substrate side, for example. Accordingly, in the conventional TFT-type liquid crystal display panel, for example, it is necessary to set a height of the second columnar members such that the height falls within a predetermined range.

Still further, in manufacturing the TFT-type liquid crystal display panel, when the liquid crystal material is hermetically filled by a liquid-crystal dropping filling method (ODF method) and a dropping quantity of the liquid crystal material is larger than a predetermined quantity, there arises adhesion failure between the sealing material and the counter substrate (or the TFT substrate) or leaking of the liquid crystal material. Accordingly, in hermetically filling the liquid crystal material by the liquid-crystal dropping filling method, it is necessary to set a dropping quantity of the liquid crystal material to a predetermined value or a value smaller than the predetermined value.

However, in forming the first columnar members and the second columnar members by exposing and developing one photosensitive material film, it is difficult to perform a control of a height of the second columnar members such that the height of the second columnar member is set smaller than a height of the first columnar members. Accordingly, for example, in simultaneously forming a plurality of counter substrates using one mother glass, irregularities are liable to occur in height of the second columnar members in the respective counter substrates obtained from one mother glass.

As described above, the conventional TFT-type liquid crystal display panel in which the liquid crystal material is filled by the liquid-crystal dropping filling method has a drawback that it is difficult to prevent the generation of bubbles in the liquid crystal material and the generation of color irregularities when the liquid crystal display panel is pushed while maintaining the uniform cell gap of the liquid crystal material.

Further, the above-mentioned drawback is particularly conspicuous in a multi-piece simultaneously forming method which simultaneously forms ten and some liquid crystal display panels to several tens of liquid crystal display panels using a set of mother glasses as in the case of liquid crystal display panels for mobile phone terminals, for example, and there has been a demand for countermeasures which can overcome such a drawback.

Accordingly, it is an object of the present invention to provide a technique which can reduce the generation of bubbles in a liquid crystal material of a liquid crystal display panel and the generation of color irregularities when the liquid crystal display panel is pushed.

The above-mentioned and other objects and novel features of the present invention will become apparent from the description of this specification and attached drawings.

To briefly explain the summary of typical inventions among inventions described in this specification, they are as follows.

(1) In a display device having a liquid crystal display panel in which a liquid crystal material is filled between a first substrate and a second substrate, the second substrate forms, on a surface of an insulation substrate which faces the first substrate, first columnar members, second columnar members and third columnar members which differ from each other in a distance from the surface of the insulation substrate to a top portion of each columnar member, assuming the distance of the first columnar member as $L1$, the distance of the second columnar member as $L2$ and the distance of the third columnar member as $L3$, a relationship among the distances $L1$, $L3$, $L2$ satisfies $L1>L3>L2$, and assuming the number of the first columnar members arranged on the surface of the insulation substrate as $N1$, the number of the second columnar members arranged on the surface of the insulation substrate as $N2$ and the number of the third columnar members arranged on the surface of the insulation substrate as $N3$, a relationship among the numbers $N1$, $N2$, $N3$ satisfies $N2>N1>N3$.

(2) In the display device having the constitution (1), assuming an area of a surface of the first columnar member which faces the insulation substrate as $S1$, an area of a surface of the second columnar member which faces the insulation substrate as $S2$ and an area of a surface of the third columnar member which faces the insulation substrate as $S3$, a relationship among the areas $S1$, $S2$, $S3$ satisfies $S1>S3>S2$.

(3) In the display device having the constitution (1), the first substrate and the second substrate are adhered to each other by a closed annular adhesive material which is arranged between the first substrate and the second substrate.

(4) In the display device having the constitution (1), the first substrate forms a plurality of scanning signal lines, a plurality of video signal lines, a plurality of TFT elements and a plurality of pixel electrodes on a surface of an insulation substrate.

(5) In the display device having the constitution (1), the first columnar members, the second columnar members and the third columnar members are respectively formed in a frusto-conical shape or a frusto-pyramidal shape which is tapered from a surface of the insulation substrate of the second substrate.

(6) In the display device having the constitution (1), the first columnar members, the second columnar members and the third columnar members are respectively tapered form a surface of the insulation substrate of the second substrate, and the top portions of the respective columnar members have a convex curved surface.

According to the display device of the present invention, even when the distance $L2$ of the second columnar members and the distance of the third columnar members are smaller than predetermined values, for example, the third columnar members function as a substitute for the second columnar members and hence, the generation of bubbles in the liquid crystal material of the liquid crystal display panel and the generation of color irregularities when the liquid crystal display panel is pushed can be reduced.

DESCRIPTION OF THE PREFERRED EMBODIMENTS

Hereinafter, embodiments of the present invention are explained in detail in conjunction with attached drawings.

Here, in all drawings for explaining the embodiments, parts having identical functions are given same symbols and their repeated explanation is omitted.

Figure 1A:
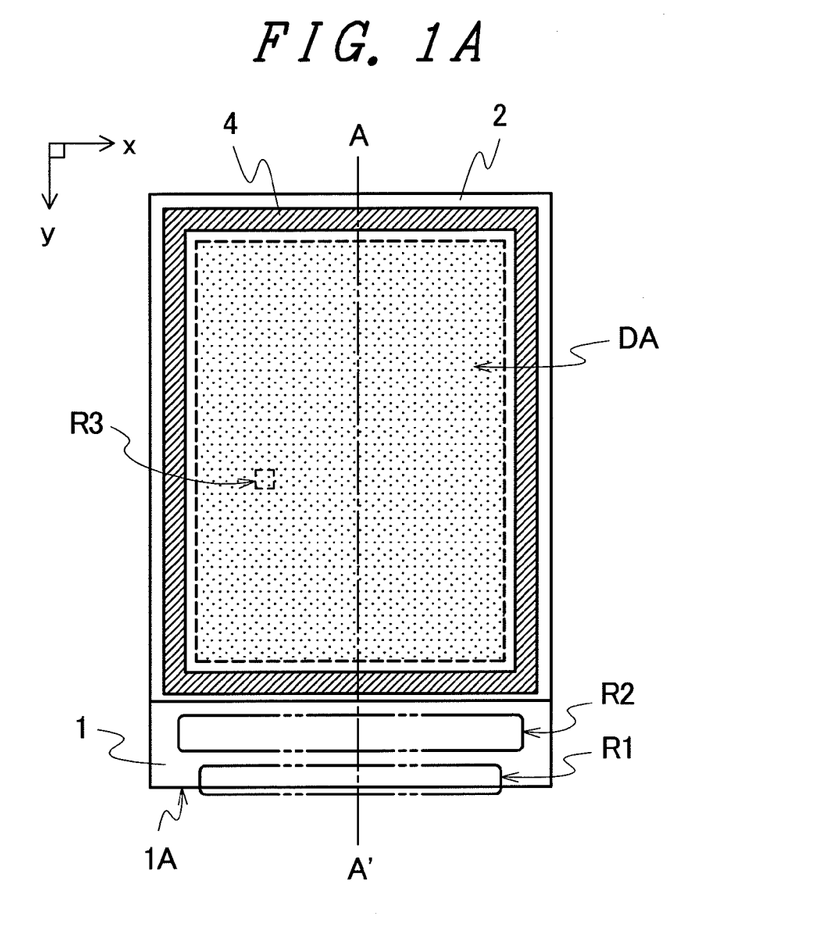
FIG. 1A is a schematic front view showing one example of the schematic constitution of a conventional liquid crystal display panel.
Figure 1B:
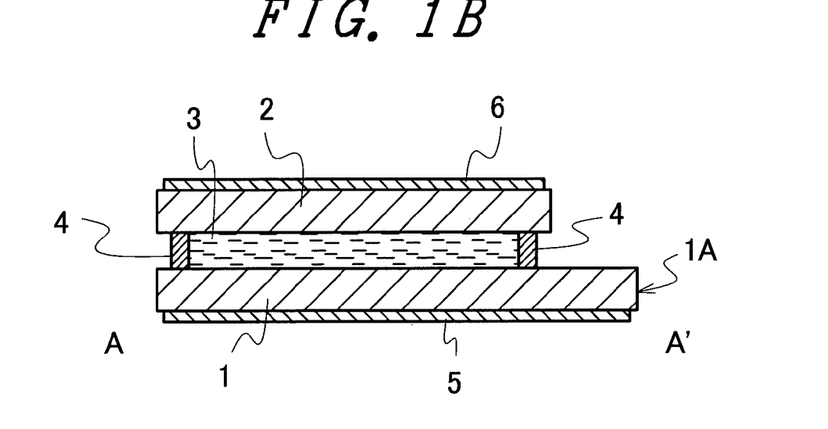
FIG. 1B is a schematic cross-sectional view showing one example of the cross-sectional constitution taken along a line A-A' in FIG. 1A.
Figure 1C:
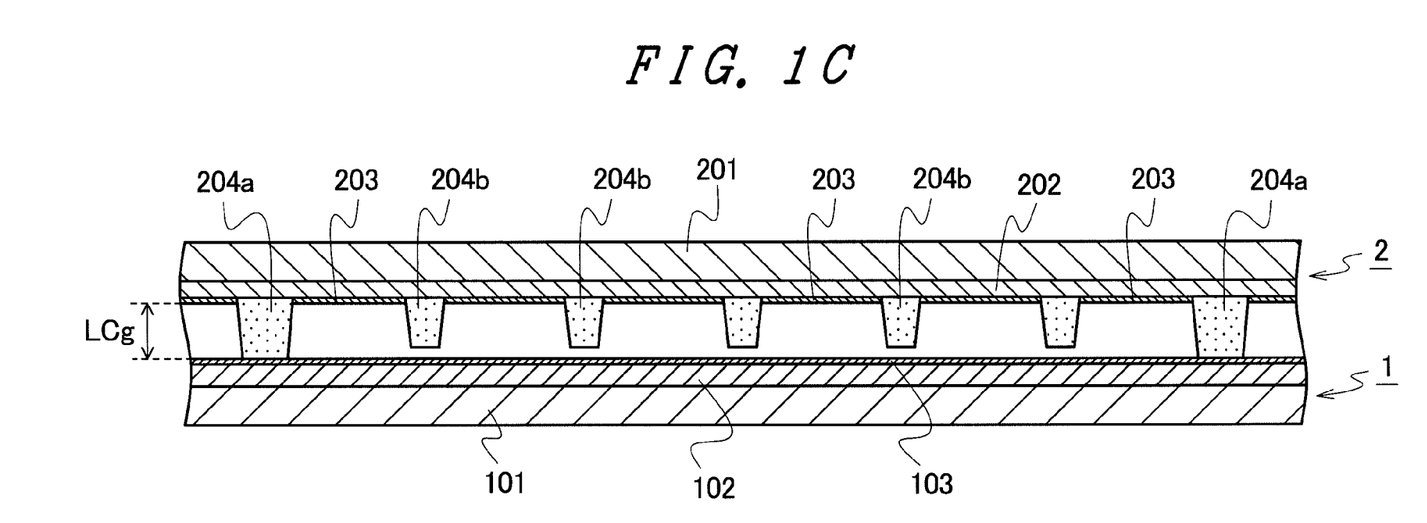
FIG. 1C is a schematic cross-sectional view showing one example of the schematic constitution of a TFT substrate and a counter substrate within a display region DA in FIG. 1A.

FIG. 1A to FIG. 1C are schematic views showing one example of the schematic constitution of a conventional liquid crystal display panel.

FIG. 1A is a schematic front view showing one example of the schematic constitution of the conventional liquid crystal display panel. FIG. 1B is a schematic cross-sectional view showing one example of the cross-sectional constitution taken along a line A-A' in FIG. 1A. FIG. 1C is a schematic cross-sectional view showing one example of the schematic constitution of a TFT substrate and a counter substrate within a display region DA in FIG. 1A.

Here, the cross-sectional constitution shown in FIG. 1C is not the cross-sectional constitution taken along a specific straight line such as a line A-A' in FIG. 1A but is the cross-sectional constitution formed by combining the cross-sectional constitution of portions of the display region DA where first columnar members are formed and the cross-sectional constitution of portions of the display region DA where second columnar members are formed.

The present invention is applicable to, for example, a miniaturized liquid crystal display panel used in a liquid crystal display of a mobile phone terminal or the like. The liquid crystal display panel used in a liquid crystal display of a conventional mobile phone terminal includes, for example, as shown in FIG. 1A and FIG. 1B, a TFT substrate 1, a counter substrate 2, a liquid crystal material 3, a sealing material (adhesive material) 4, a lower polarizer 5 and an upper polarizer 6.

With respect to the TFT substrate 1, for example, as shown in FIG. 1C, an integrated circuit forming layer 102 is formed on a surface (a surface facing the counter substrate 2) of an insulation substrate 101 such as a glass substrate or the like, and an alignment film 103 is formed on the integrated circuit forming layer 102. On the integrated circuit forming layer 102, for example, a plurality of scanning signal lines, a plurality of video signal lines, TFT elements, pixel electrodes and the like are formed. Further, in a region R1 of the TFT substrate 1 formed along one side 1A of the TFT substrate 1, for example, external connection terminals for inputting signals which are applied to the plurality of scanning signal lines, the plurality of video signal lines and the like are arranged. Further, in a region R2 of the TFT substrate 1, for example, semiconductor chips such as driver ICs are mounted.

With respect to the counter substrate 2, for example, as shown in FIG. 1C, a thin film layer 202 is formed on a surface (a surface facing the TFT substrate 1) of an insulation substrate 201 such as a glass substrate or the like and, on a surface of the thin film layer 202, an alignment film 203, first columnar members 204a and second columnar members 204b are formed. On the thin film layer 202, for example, a light blocking film (referred to as a black matrix in general) which divides a display region DA into individual pixel regions, color filters, a leveling film and the like are formed.

Further, FIG. 1C shows the cross-sectional constitution of the liquid crystal display panel when the first columnar members 204a and the second columnar members 204b are formed on the surface of the thin film layer 202 and, thereafter, the alignment film 203 is formed on the thin film layer 202.

The first columnar members 204a are columnar members which are provided for maintaining a uniform cell gap LCg when the TFT substrate 1 and the counter substrate 2 are adhered to each other using the sealing material 4. On the other hand, the second columnar members 204b are columnar members which are provided for preventing the generation of bubbles in the liquid crystal material 3 and the generation of color irregularities when the liquid crystal display panel is pushed after the TFT substrate and the counter substrate 2 are adhered to each other using the seal material 4. The second columnar members 204b are formed lower than the first columnar members 204a.

Here, the combination of the constitution of the integrated circuit forming layer 102 of the TFT substrate 1 and the constitution of the thin film layer 202 of the counter substrate 2 in the liquid crystal display panel according to the present invention may take any combination. That is, in the liquid crystal display panel according to the present invention, counter electrodes each of which forms a pair with the pixel electrode in driving the liquid crystal material 3 may be formed on the integrated circuit forming layer 102 or may be formed on the thin film layer 202. Further, in the liquid crystal display panel according to the present invention, the TFT element may adopt either the bottom gate structure in which a semiconductor layer is arranged on a gate electrode as viewed from the insulation substrate 101 or the top gate structure in which the gate electrode is arranged above the semiconductor layer as viewed from the insulation substrate 101.

The sealing material 4 is provided for hermetically sealing the liquid crystal material 3 in a space defined between the TFT substrate 1 and the counter substrate 2. A planar shape of the sealing material 4 when the liquid crystal display panel is viewed from a front side thereof is formed in a closed annular shape which surrounds the display region DA as shown in FIG. 1A, for example. Further, the sealing material 4 is, for example, made of a photo-curing resin or a thermosetting resin, and is adhered to a surface of the TFT substrate 1 and a surface of the counter substrate 2.

Further, when the liquid crystal display panel is a transmissive liquid crystal display panel or a transflective liquid crystal display panel, for example, as shown in FIG. 1B, the lower polarizer 5 is adhered to a back surface (a back surface of a surface facing the counter substrate 2) of the TFT substrate 1, and the upper polarizer 6 is adhered to a back surface (a back surface of a surface facing the TFT substrate 1) of the counter substrate 2. Further, although not shown in FIG. 1B, a one-layered or a plural-layered phase difference sheet may be interposed between the TFT substrate 1 and the lower polarizer 5 as well as between the counter substrate 2 and the upper polarizer 6.

On the other hand, when the liquid crystal display panel is a reflective liquid crystal display panel, the lower polarizer 5 is unnecessary, and a reflective film is formed on the integrated circuit forming layer 102 as a substitute for the lower polarizer 5, for example.

In forming the first columnar members 204a and the second columnar members 204b on the counter substrate 2 of such a liquid crystal display panel, to take productivity into consideration, it is desirable to simultaneously form the first columnar members 204a and the second columnar members 204b, for example, by forming a photosensitive material film on a surface of the thin film layer 202 and by exposing and developing the photosensitive material film. Further, in adhering the TFT substrate 1 and the counter substrate 2 to each other using the sealing material 4, as shown in FIG. 1C, it is desirable that the second columnar members 204b are formed with a height which prevents the second columnar members 204b from coming into contact with the TFT substrate 1 and prevents the cell gap from assuming a value not lower than a predetermined lower limit value when the liquid crystal material 3 shrinks in a low temperature environment or when a pressure is applied to the liquid crystal display panel from the outside.

Here, the first columnar members 204a and the second columnar members 204b are formed using a negative photosensitive material film, for example. By setting an exposure quantity at portions of the negative photosensitive material film where the second columnar members 204b are formed smaller than an exposure quantity at portions of the negative photosensitive material film where the first columnar members 204a are formed, it is possible to simultaneously form the first columnar members 204a and the second columnar members 204b which differ from each other in height.

However, in forming the first columnar members 204a and the second columnar members 204b using the negative photosensitive material film, for example, the portions of the negative photosensitive material film where the second columnar members 204b are formed are liable to exhibit irregularities in exposure quantity and hence, the second columnar members 204b are liable to exhibit irregularities in heights thereof.

Here, in this specification, irregularities in heights of the second columnar members 204b mean, for example, irregularities in average heights of the second columnar members 204b formed on the respective counter substrates 2 when a plurality of counter substrates 2 is simultaneously manufactured using one sheet of mother glass. That is, when the average height of the second columnar members 204b formed on the counter substrate 2 formed in one portion of one sheet of mother glass and the average height of the second columnar members 204b formed on the counter substrate 2 formed in another portion of the mother glass are compared with each other, the difference between the average heights is liable to be increased.

Here, when the height of the second columnar members 204b formed on one counter substrate 2 is set to a value lower than a predetermined range, for example, in a liquid crystal display panel using the counter substrate 2, it is not possible to prevent the generation of bubbles in the liquid crystal material 3 and the generation of the color irregularities when the liquid crystal display panel is pushed.

Embodiment

Figure 2A:
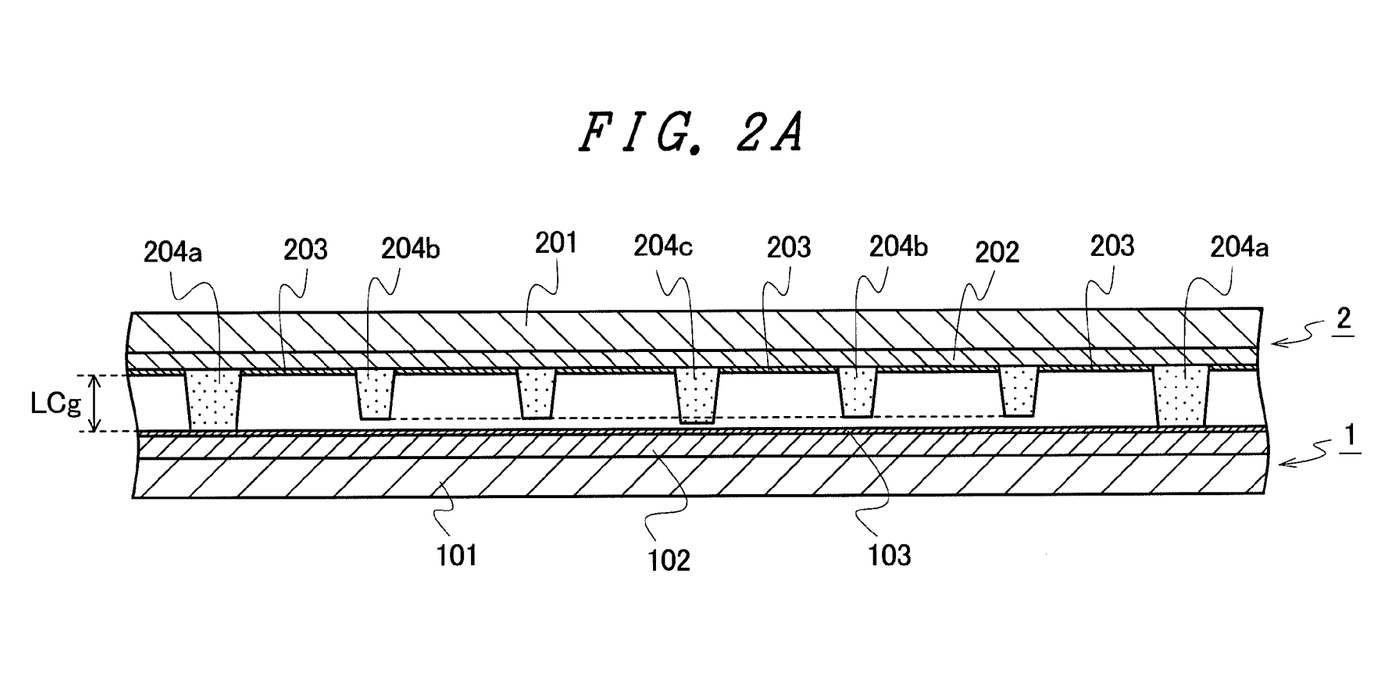
FIG. 2A is a schematic cross-sectional view showing one example of the schematic constitution of the TFT substrate and the counter substrate of a liquid crystal display panel of one embodiment according to the present invention.
Figure 2B:
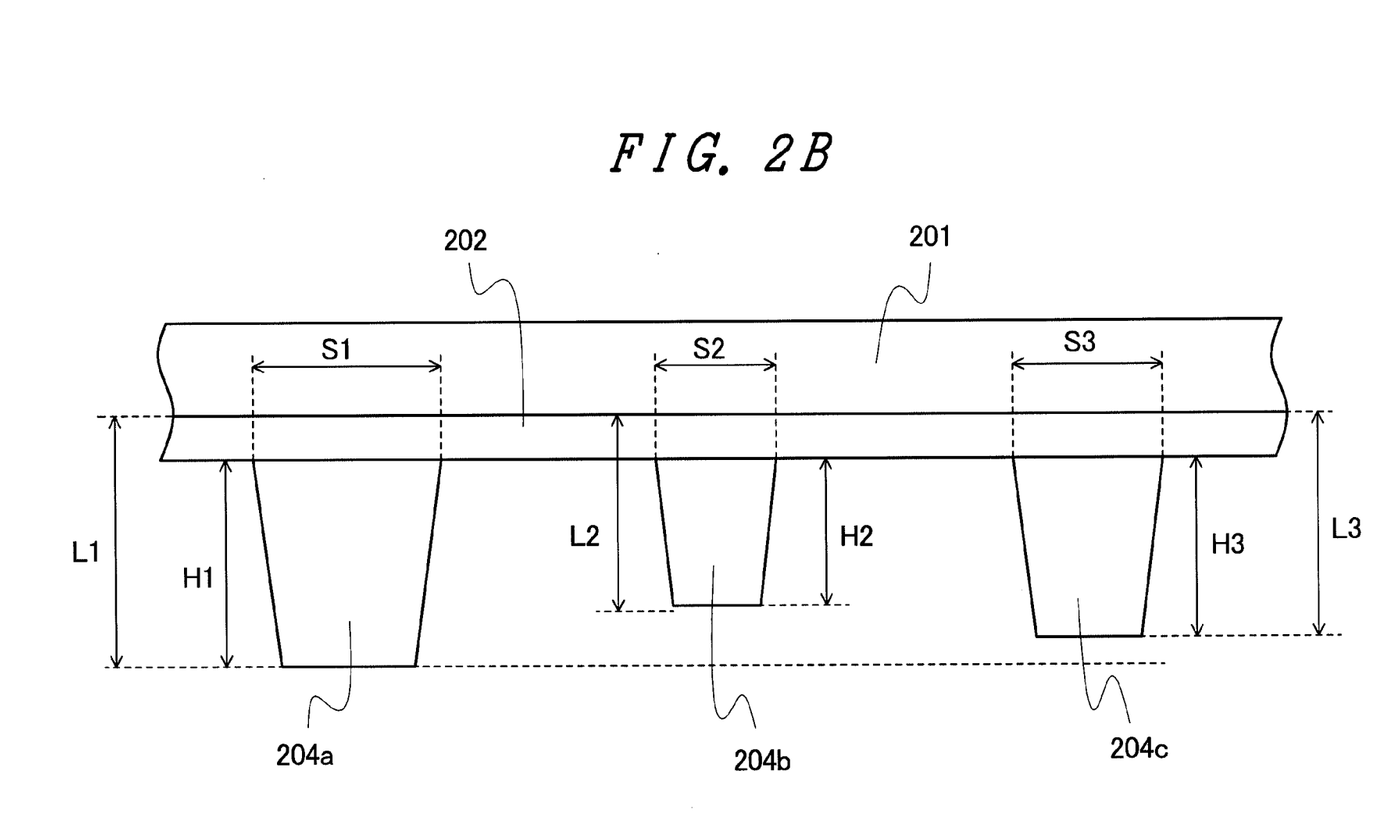
FIG. 2B is a schematic cross-sectional view for explaining a relationship among three kinds of columnar members shown in FIG. 2A.

FIG. 2A and FIG. 2B are schematic views showing the schematic constitution of the liquid crystal display panel of one embodiment according to the present invention.

FIG. 2A is the schematic cross-sectional view showing one example of the schematic constitution of the TFT substrate and the counter substrate of the liquid crystal display panel of one embodiment according to the present invention. FIG. 2B is a schematic cross-sectional view for explaining a relationship among three kinds of columnar members shown in FIG. 2A.

Here, FIG. 2A shows one example of the cross-sectional constitution of the TFT substrate and the counter substrate within the display region DA when the present invention is applied to the liquid crystal display panel having the constitution shown in FIG. 1A and FIG. 1B. Further, FIG. 2A does not show the cross-sectional constitution taken along a specific straight line such as a line A-A' in FIG. 1A but shows the cross-sectional constitution formed by combining the cross-sectional constitution of portions where the first columnar members 204a are formed within the display region DA, the cross-sectional constitution of portions where the second columnar members 204b are formed within the display region DA, and the cross-sectional constitution of portions where the third columnar members 204c are formed within the display region DA.

Further, FIG. 2B shows only the counter substrate 2, and hatching which is used for expressing the cross-sectional constitution is omitted.

In the liquid crystal display panel of this embodiment, for example, as shown in FIG. 2A and FIG. 2B, on a surface of a thin film layer 202 of the counter substrate 2, three kinds of columnar members which differ from each other in height, that is, the first columnar members 204a having a height H1, the second columnar members 204b having a height H2 and the third columnar members 204c having a height H3 are formed. Here, a relationship among the height H1 of the first columnar member 204a, the height H2 of the second columnar member 204b and the height H3 of the third columnar member 204c satisfies H1>H3>H2. Further, the first columnar members 204a, the second columnar members 204b and the third columnar members 204c are respectively formed in a frusto-conical shape or a frusto-pyramidal shape which is tapered from the surface of the insulation substrate 201.

Here, the second columnar members 204b are columnar members which are provided for preventing the generation of bubbles in the liquid crystal material 3 and the generation of color irregularities when the liquid crystal display panel is pushed. Accordingly, the height H2 of the second columnar members 204b is set to a height equal to a height of columnar members having an equal function on a counter substrate of a conventional liquid crystal display panel, for example.

Further, a relationship between the number N1 of the first columnar members 204a and the number N2 of the second columnar members 204b is set to satisfy N2>N1. By adopting such a relationship, it is possible to prevent the generation of bubbles in the liquid crystal material 3 and the generation of color irregularities when the liquid crystal display panel is pushed while maintaining a uniform cell gap LCg by the first columnar members 204a.

Further, the third columnar members 204c are columnar members which are provided for preventing the generation of bubbles in the liquid crystal material 3 and the generation of color irregularities when the liquid crystal display panel is pushed in place of the second columnar members 204b when the height H2 of the second columnar members 204b is set to a value lower than a predetermined range, for example. Accordingly, the height H3 of the third columnar members 204c is set larger than the height H2 of the second columnar members 204b. However, when the height H3 of the third columnar members 204c becomes substantially equal to the height H1 of the first columnar members 204a, the third columnar members 204c have the substantially same function as the first columnar members 204a. In view of the above, the height H3 of the third columnar members 204c is set such that the height H3 of the third columnar members 204c becomes larger than the height H2 of the second columnar members 204b even when the height H3 of the third columnar members 204c assumes the lowest value due to the generation of irregularities in height at the time of forming the third columnar members 204c and, at the same time, the height H3 of the third columnar members 204c becomes smaller than the height H1 of the first columnar members 204a even when the height H3 of the third columnar members 204c assumes the highest value due to the generation of irregularities in height at the time of forming the third columnar members 204c.

Here, it is desirable to set the number N3 of the third columnar members 204c smaller than the number N1 of the first columnar members 204a. That is, it is desirable that a relationship among the numbers N1, N2, N3 of the respective columnar members satisfies N2>N1>N3. By adopting such a relationship, for example, it is possible to reduce the influence of the third columnar members 204c on the advantageous effects acquired by the second columnar members 204b, that is, the advantageous effects that the generation of bubbles in the liquid crystal material 3 can be prevented and the generation of color irregularities when the liquid crystal display panel is pushed can be prevented.

Further, due to the decrease of the number N3 of the third columnar members 204c, for example, even when the height H3 of the third columnar members 204c assumes the highest value, it is possible to reduce the influence of the third columnar members 204c which leads to the non-uniformity of the cell gap LCg and the generation of bubbles in the liquid crystal material 3.

Further, with respect to the above-mentioned constitution of the respective columnar members, for example, it is desirable to apply such a constitution to the counter substrate 2 of the liquid crystal display panel in which the liquid crystal material 3 is filled (hermetically filled) by a liquid-crystal dropping filling method. In the liquid-crystal dropping filling method, for example, a closed annular sealing material 4 which surrounds the display region DA is printed on the alignment film 103 of the TFT substrate 1, the liquid crystal material 3 is dropped in the region surrounded by the sealing material 4 and, thereafter, the counter substrate 2 is made to overlap with the TFT substrate 1 and is adhered to the TFT substrate 1 using the sealing material 4. Here, when a quantity of the dropping liquid crystal material 3 is larger than a predetermined quantity (proper quantity), for example, an adhesive area between the sealing material 4 and the counter substrate 2 is decreased so that peeling is liable to easily occur thus causing leaking of the liquid crystal material 3 to the outside of the liquid crystal display panel. Accordingly, it is necessary to control the quantity of the dropping liquid crystal material 3 to the proper quantity or a quantity below the proper quantity.

However, in the case of the conventional liquid crystal display panel having only two kinds of columnar members which differ from each other in height as shown in FIG. 1C, for example, when the height of the second columnar members 204b is insufficient and the dropping quantity of the liquid crystal material 3 is smaller than a proper quantity, for example, bubbles are liable to be easily generated in the liquid crystal material 3. Further, in the case of the conventional liquid crystal display panel, when the height of the second columnar members 204b is insufficient and the dropping quantity of the liquid crystal material 3 is smaller than the proper quantity, the cell gap at a portion remote from a position where the first columnar member 204a is arranged becomes smaller thus easily generating color irregularities.

Accordingly, in this embodiment, the third columnar members 204c are provided to the counter substrate 2 of the liquid crystal display panel. Due to the provision of such third columnar members 204c, even when a height of the second columnar member 204b is insufficient and the dropping quantity of the liquid crystal material 3 is smaller than a proper quantity, it is possible to suppress the generation of bubbles in the liquid crystal material 3 and generation of color irregularities when the liquid crystal display panel is pushed.

In simultaneously forming the first columnar members 204a, the second columnar members 204b and the third columnar members 204c using one negative photosensitive material film, for example, irregularities in height H1 of the first columnar members 204a, irregularities in height H2 of the second columnar members 204b and irregularities in height H3 of the third columnar members 204c are respectively approximately ±0.1 µm, approximately ±0.2 µm, and approximately ±0.15 µm. Accordingly, for example, when the height H1 of the first columnar members 204a is set to approximately 4 µm, the height H2 of the second columnar members 204b, and the height H3 of the third columnar members 204c are set to approximately 3.4 µm and approximately 3.6 µm respectively.

Here, with respect to the counter substrate 2 in general, the thin film layer 202 is constituted of the leveling film (also referred to as an overcoat layer) formed on the light blocking film and the color filters and hence, a surface of the thin film layer 202 on which the first columnar members 204a, the second columnar members 204b and the third columnar members 204c are formed is usually formed of a flat surface. Accordingly, with respect to the counter substrate 2 in general, provided that the relationship among the heights of the respective columnar members satisfies H1>H3>H2, a relationship among a distance L1 from the surface of the insulation substrate 201 of the counter substrate 2 to a top portion of the first columnar member 204a, a distance L2 from the surface of the insulation substrate 201 of the counter substrate 2 to a top portion of the second columnar member 204b and a distance L3 from the surface of the insulation substrate 201 of the counter substrate 2 to a top portion of the third columnar member 204c satisfies L1>L3>L2.

Further, although not shown in the drawing, when unevenness exists on the surface (the surface on which the respective columnar members are formed) of the thin film layer 202, the heights H1, H2, H3 of the respective columnar members may be adjusted so that the relationship among the distances L1, L2, L3 from the surface of the insulation substrate 201 of the counter substrate 2 to the top portions of the respective columnar members satisfies L1>L3>L2.

In the liquid crystal display panel (counter substrate 2) of this embodiment, it is desirable that the first columnar members 204a, the second columnar members 204b and the third columnar members 204c are simultaneously formed from one negative photosensitive material film, for example. Here, a relationship among an area S1 of a surface of the first columnar member 204a which faces the insulation substrate 201, an area S2 of a surface of the second columnar member 204b which faces the insulation substrate 201 and an area S3 of a surface of the third columnar member 204c which faces the insulation substrate 201 satisfies S1>S3>S2. A manufacturing method of the respective columnar members, the relationship among the heights H1, H2, H3 of the respective columnar members, and the relationship among the areas S1, S2, S3 of the surfaces of the respective columnar members are explained briefly in conjunction with FIG. 3A and FIG. 3B.

Figure 3A:
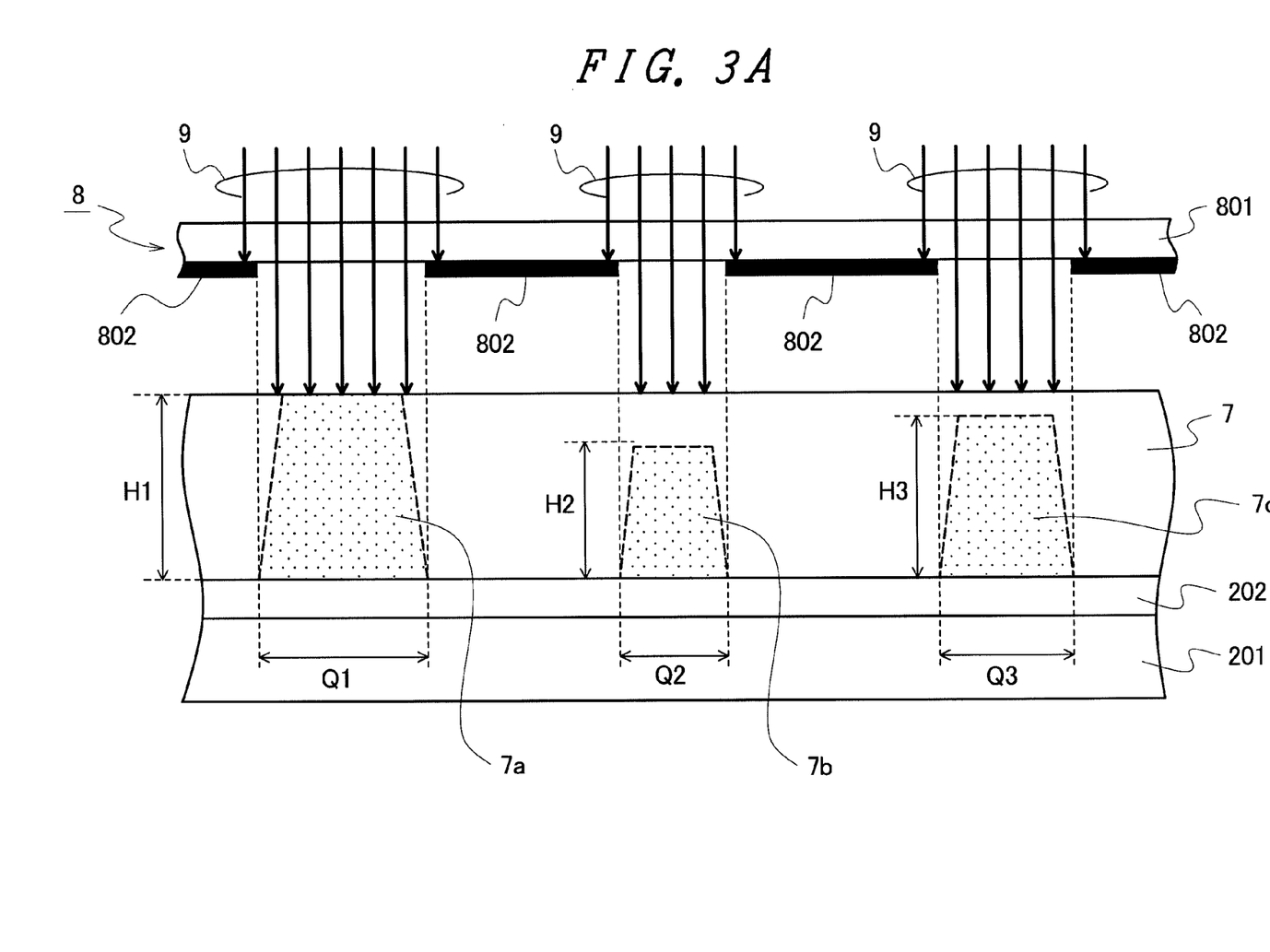
FIG. 3A is a schematic cross-sectional view showing one example of a method of forming the respective columnar members of this embodiment.
Figure 3B:
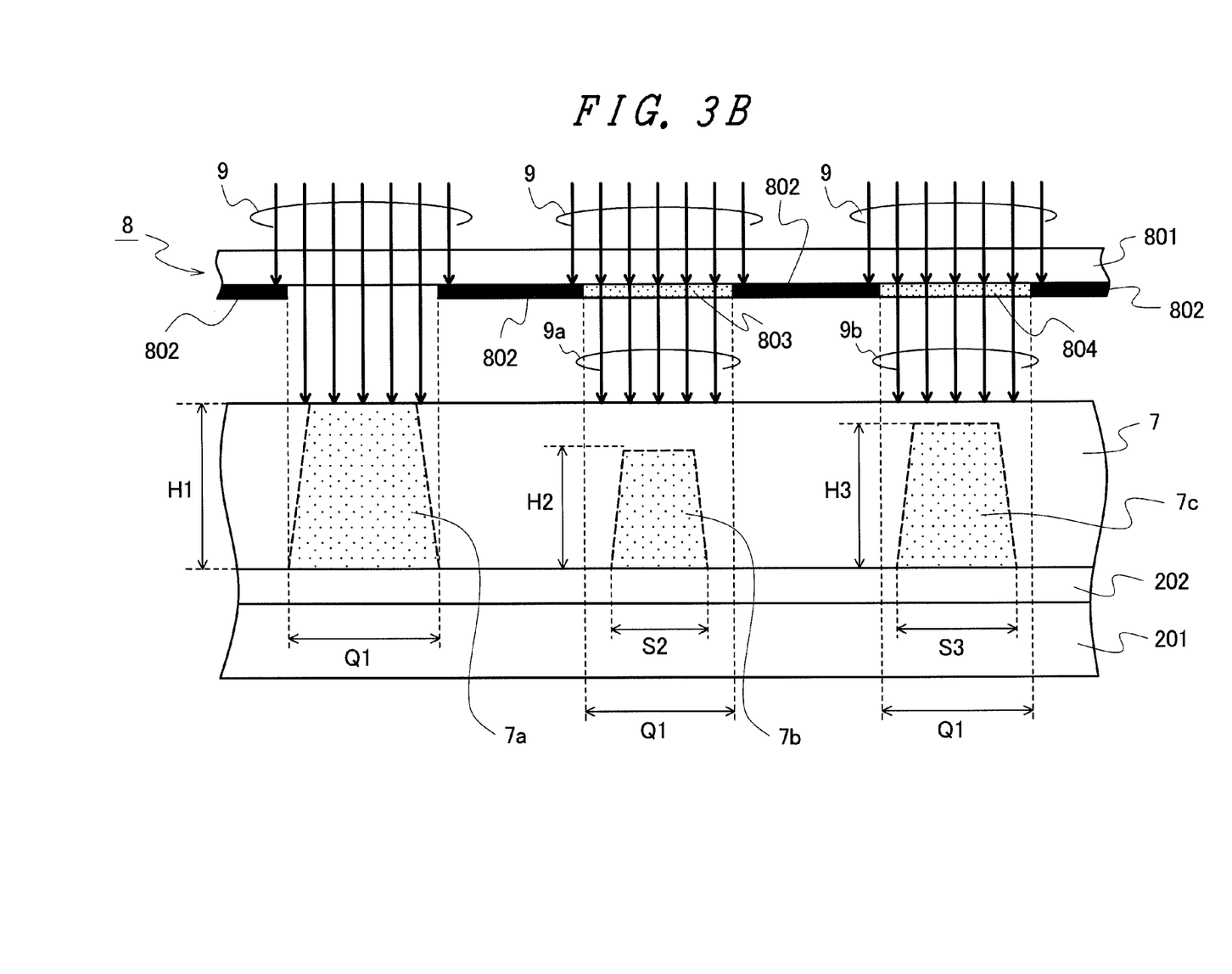
FIG. 3B is a schematic cross-sectional view showing another example of the method of forming the respective columnar members of this embodiment.

FIG. 3A is a schematic cross-sectional view showing one example of a method of forming the respective columnar members of this embodiment. FIG. 3B is a schematic cross-sectional view showing another example of the method of forming the respective columnar members of this embodiment.

Here, FIG. 3A and FIG. 3B show an example of an exposure method at the time of forming three columnar members shown in FIG. 2B.

With respect to the manufacturing steps of the counter substrate 2, in simultaneously forming the first columnar members 204a, the second columnar members 204b and the third columnar members 204c, for example, as shown in FIG. 3A, a negative photosensitive material film 7 having a thickness H1 is formed on a surface of the thin film layer 202, and the photosensitive material film 7 is exposed using an exposure device having a photo mask 8. In the photo mask 8, a light blocking pattern 802 made of a metal material having high light blocking property is formed on a surface of a transparent substrate 801 made of quarts glass or the like, for example. Openings are formed in the light blocking pattern 802 at positions of the photosensitive material film 7 where the first columnar members 204a are formed, at positions of the photosensitive material film 7 where the second columnar members 204b are formed and at positions of the photosensitive material film 7 where the third columnar members 204c are formed thus forming a pattern which allows the transmission of light 9 through the respective openings.

Here, the light blocking pattern 802 of the photo mask 8 is designed such that, for example, as shown in FIG. 3A, a relationship among a radiation range Q1 corresponding to the position where the first columnar member 204a is formed, a radiation range Q2 corresponding to the position where the second columnar member 204b is formed and a radiation range Q3 corresponding to the position where the third columnar member 204c is formed assumes the same relationship (Q1>Q3>Q2) as the relationship among the heights H1, H2, H3 of the respective columnar members. By adopting such a light blocking pattern 802, after the exposure of the photosensitive material film 7, at positions where the respective columnar members are formed, for example, as shown in FIG. 3A, photosensitive regions 7a which remain as the first columnar members 204a, photosensitive regions 7b which remain as the second columnar members 204b and photosensitive regions 7c which remain as the third columnar members 204c are formed. When these photosensitive regions 7a, 7b, 7c are developed, thereafter, it is possible to obtain the first columnar members 204a, the second columnar members 204b and the third columnar members 204c which satisfy the above-mentioned conditions.

Here, the height H2 of the second columnar members 204b and the height H3 of the third columnar members 204c can be adjusted by changing the radiation range Q2 corresponding to the position where the second columnar member 204b is formed and the radiation range Q3 corresponding to the position where the third columnar member 204c is formed.

Further, in exposing the photosensitive material film 7 using the photo mask 8, the light blocking pattern 802 of the photo mask 8 may be designed, for example, as shown in FIG. 3B, in a pattern in which the openings are formed such that all radiation ranges of light radiated to the positions where the respective columnar members are formed become Q1. In this case, in the opening portion through which the light 9 radiated to the position where the second columnar member 204b is formed passes and in the opening portion through which the light 9 radiated to the position where the third columnar member 204c is formed passes, a first light transmission pattern 803 and a second light transmission pattern 804 which differ from each other in optical transmissivity are arranged respectively. Here, for example, by setting the optical transmissivity of the first light transmission pattern 803 smaller than the optical transmissivity of the second light transmission pattern 804, a relationship among light quantity (intensity) of the light 9 which is radiated to the position where the first columnar member 204a is formed, light quantity of light 9a which is radiated to the position where the second columnar member 204b is formed and light quantity of light 9b which is radiated to the position where the third columnar member 204c is formed assumes the same relationship as the relationship of the heights H1, H2, H3 of the respective columnar members. By adopting such a light blocking pattern 802, after the exposure of the photosensitive material film 7, at positions where the respective columnar members are formed, for example, as shown in FIG. 3B, the photosensitive regions 7a which remain as the first columnar members 204a, the photosensitive regions 7b which remain as the second columnar members 204b and the photosensitive regions 7c which remain as the third columnar members 204c are formed. When these photosensitive regions 7a, 7b, 7c are developed, thereafter, it is possible to obtain the first columnar members 204a, the second columnar members 204b and the third columnar members 204c which satisfy the above-mentioned conditions.

Here, the height H2 of the second columnar members 204b and the height H3 of the third columnar members 204c can be adjusted by changing the optical transmissivity of the first light transmission pattern 803 and the optical transmissivity of the second light transmission pattern 804.

In this embodiment, as an example of shapes of the respective columnar members, the case in which the columnar member has a frusto-conical shape or a frusto-pyramidal shape which has a flat surface on the top portion thereof is exemplified. However, the top portion of each columnar member may have a convex curved surface.

Figure 4A:
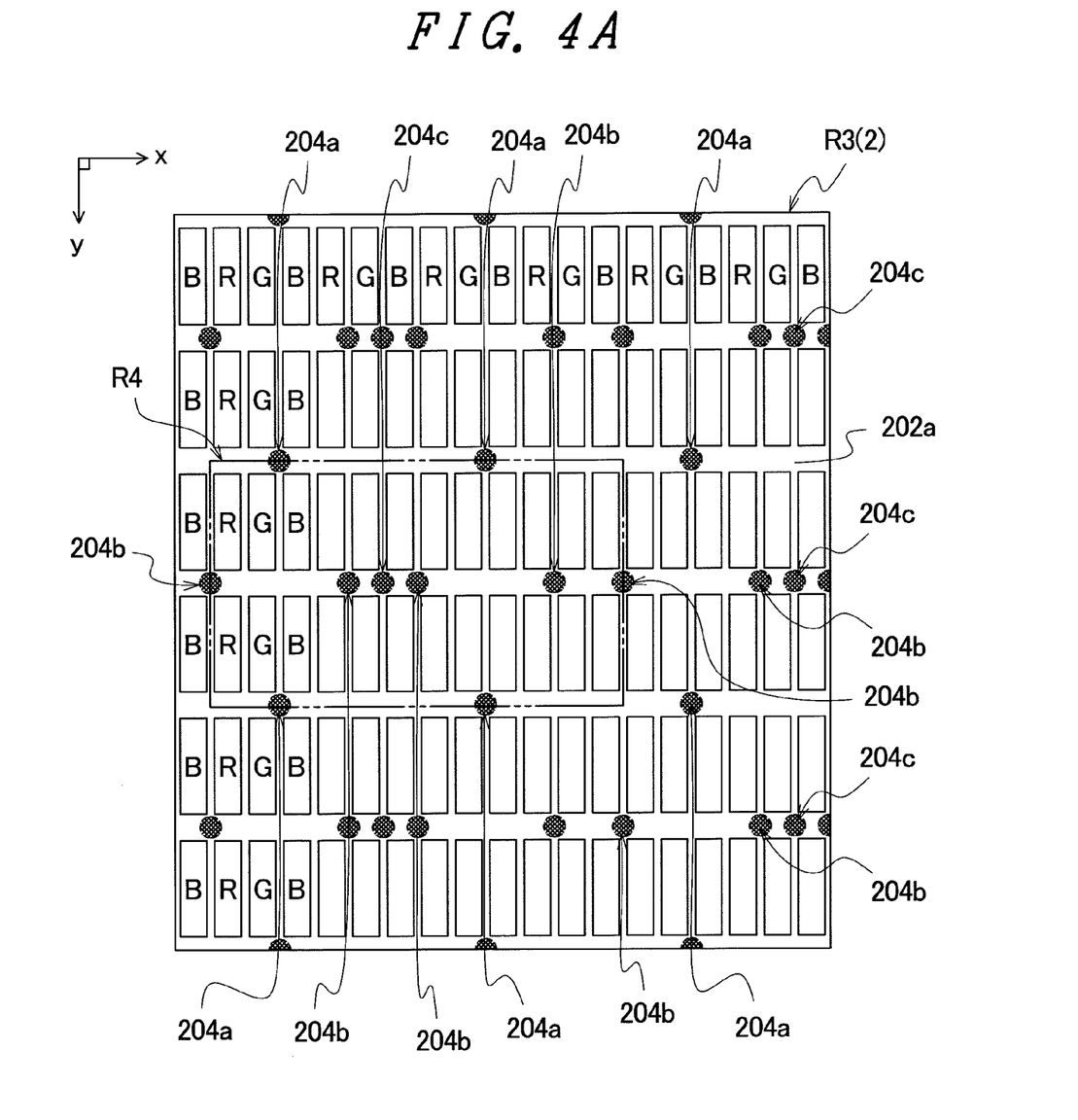
FIG. 4A is a schematic front view showing one example of an arrangement method of the respective columnar members when the liquid crystal display panel of this embodiment is viewed from a counter substrate side.
Figure 4B:
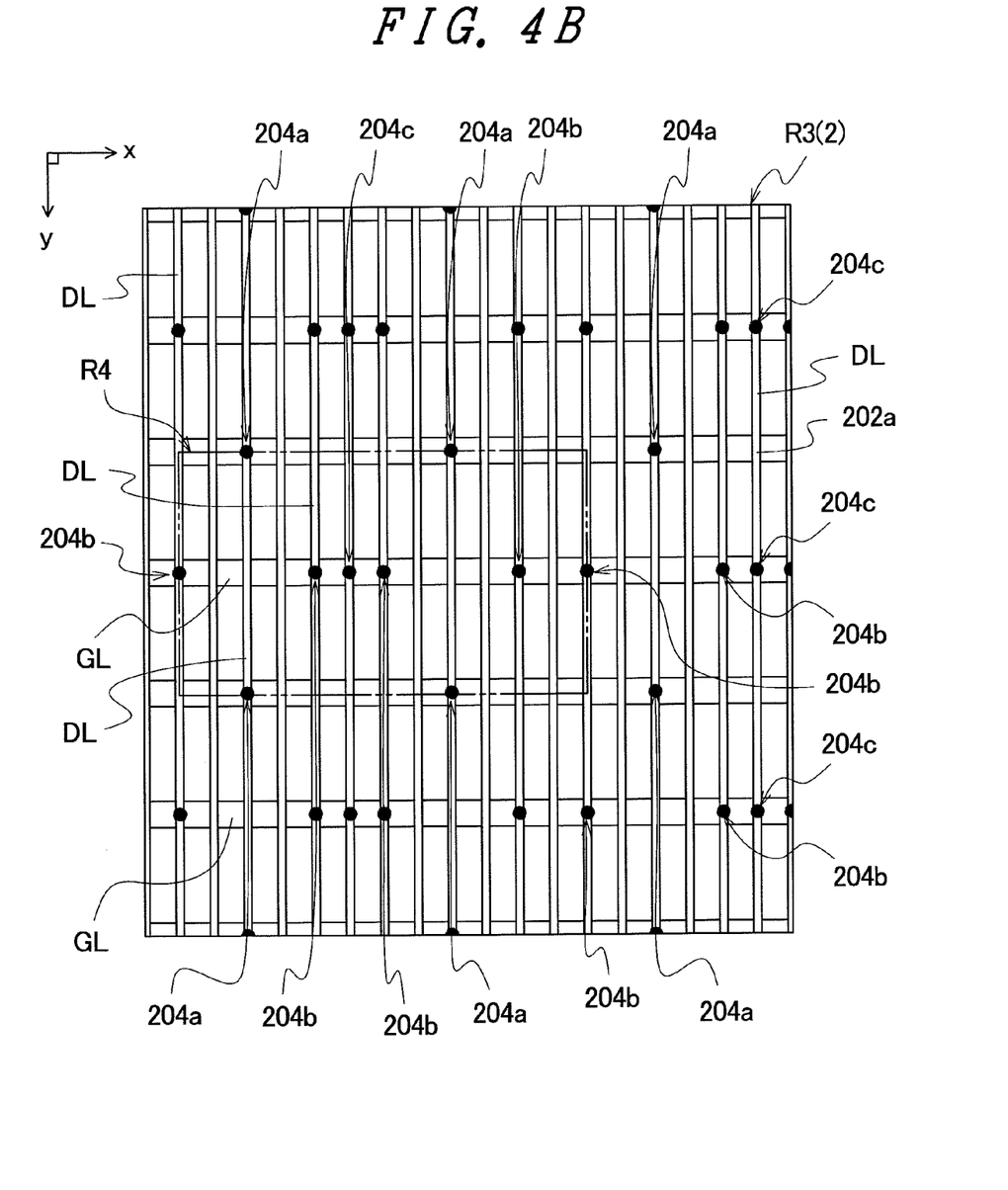
FIG. 4B is a schematic front view showing one example of arrangement positions of the respective columnar members when the TFT substrate is viewed from a surface of the TFT substrate which faces the counter substrate.

FIG. 4A and FIG. 4B are schematic views showing one example of an arrangement method of the respective columnar members of the liquid crystal display panel of this embodiment.

FIG. 4A is a schematic front view showing one example of the arrangement method of the respective columnar members when the liquid crystal display panel of this embodiment is viewed from a counter substrate side. FIG. 4B is a schematic front view showing one example of the arrangement positions of the respective columnar members when the TFT substrate is viewed from a surface of the TFT substrate which faces the counter substrate.

Here, FIG. 4A and FIG. 4B respectively show the counter substrate and the TFT substrate in a region R3 shown in FIG. 1A in an enlarged manner.

Further, FIG. 4B shows only the scanning signal lines and video signal lines. That is, the TFT elements, the pixel electrodes and the like which are arranged in respective pixels are omitted from the drawing.

In arranging the first columnar members 204a, the second columnar members 204b and the third columnar members 204c on the counter substrate 2, these columnar members are arranged such that the relationship among the numbers N1, N2, N3 of the respective columnar member satisfies N2>N1>N3, for example. Here, the first columnar members 204a, the second columnar members 204b and the third columnar members 204c are respectively arranged in regions which are different from opening regions (light transmission regions or light reflective regions) of the respective pixels, that is, in regions where the second columnar members 204b and the third columnar members 204c overlap with the light blocking film 202a of the counter substrate 2 as shown in FIG. 4A, for example.

In FIG. 4A, one longitudinal rectangular portion in the region R1 corresponds to 1 pixel (sub pixel), and opening regions of the respective sub pixels are separated from each other by a grid-shaped light blocking film 202a. Further, the rectangular portion in which R is written is the sub pixel having the red color filter, the rectangular portion in which G is written is the sub pixel having the green color filter, and the rectangular portion in which B is written is the sub pixel having the blue color filter. 1 dot of a video or an image is expressed by three subpixels consisting of the subpixel having the red color filter, the sub pixel having the green color filter and the sub pixel having the blue color filter. Although partially omitted in FIG. 4A, the sub pixel having the red color filter, the sub pixel having the green color filter and the sub pixel having the blue color filter are repeatedly arranged in the x direction in this order. Further, the subpixels having the same color are arranged in the y direction.

Here, with respect to the arrangement of the first columnar members 204a, the second columnar members 204b and the third columnar members 204c, for example, the region R4 shown in FIG. 4A constitutes a unit region, and the arrangement of the columnar members in the unit region (region R4) is repeated over the whole display region DA. In the example shown in FIG. 4A, the number of first columnar members 204a included in the region R4 is 2 (N1=2), the number of second columnar members 204b included in the region R4 is 4 (N2=4), and the number of third columnar members 204c included in the region R4 is 1 (N3=1) and hence, this arrangement satisfies the above-mentioned relationship (N2>N1>N3).

Further, at positions of the TFT substrate 1 where the TFT substrate 1 and the light blocking film which divides the sub pixels arranged longitudinally overlap with each other, as shown in FIG. 4B, the scanning signal lines GL extend respectively. Further, at positions of the TFT substrate 1 where the TFT substrate 1 and the light blocking film which divides the sub pixels arranged laterally overlap with each other, the video signal lines DL extend respectively. It is desirable that the respective columnar members are arranged at positions which assume the same relative positions with respect to the TFT substrate 1. That is, it is desirable that, for example, as shown in FIG. 4B, the respective columnar members are arranged at positions where the scanning signal lines GL and the video signal lines DL intersect with each other three-dimensionally.

The example shown in FIG. 4A and FIG. 4B merely constitutes one example of the arrangement method of the respective columnar members. That is, the present invention is not limited to such an arrangement method, and any arrangement method may be adopted provided that the relationship among the numbers N1, N2, N3 of the respective columnar members satisfies N2>N1>N3, and the relationship is repeated periodically.

Further, in the example shown in FIG. 4A and FIG. 4B, the unit region on the arrangement of the respective columnar members is formed of the region R4 of 8 dots in which 4 dots are arranged in the x direction and 2 dots are arranged in the y direction. However, it is needless to say that the unit region on the arrangement of the respective columnar members is not limited to the region R4 and may be set to a region of arbitrary size.

Still further, in the example shown in FIG. 4A, the light blocking film 202a is formed in a grid shape. However, the light blocking film 202a is not limited to such a grid shape and, for example, the light blocking film 202a may be formed in a stripe shape in which the light blocking film 202a extends at positions where the light blocking film 202a overlaps with the scanning signal lines GL on the TFT substrate 1.

Although the present invention has been specifically explained in conjunction with the embodiments heretofore, it is needless to say that the present invention is not limited to the above-mentioned embodiments and various modifications are conceivable without departing from the gist of the present invention.

What is claimed is:

1. A display device having a liquid crystal display panel in which a liquid crystal material is filled between a first substrate and a second substrate, wherein
the second substrate forms, on a surface of an insulation substrate which faces the first substrate, first columnar members, second columnar members and third columnar members which differ from each other in a distance from the surface of the insulation substrate to a top portion of each columnar member,
assuming the distance of the first columnar member as L1, the distance of the second columnar member as L2 and the distance of the third columnar member as L3, a relationship among the distances L1, L3, L2 satisfies L1>L3>L2, and
assuming the number of the first columnar members arranged on the surface of the insulation substrate as N1, the number of the second columnar members arranged on the surface of the insulation substrate as N2 and the number of the third columnar members arranged on the surface of the insulation substrate as N3, a relationship among the numbers N1, N2, N3 satisfies N2>N1>N3.

2. A display device according to claim 1, wherein assuming an area of a surface of the first columnar member which faces the insulation substrate as S1, an area of a surface of the second columnar member which faces the insulation substrate as S2 and an area of a surface of the third columnar member which faces the insulation substrate as S3, a relationship among the areas S1, S2, S3 satisfies S1>S3>S2.

3. A display device according to claim 1, wherein the first substrate and the second substrate are adhered to each other by a closed annular adhesive material which is arranged between the first substrate and the second substrate.

4. A display device according to claim 1, wherein the first substrate forms a plurality of scanning signal lines, a plurality of video signal lines, a plurality of TFT elements and a plurality of pixel electrodes on a surface of an insulation substrate.

5. A display device according to claim 1, wherein the first columnar members, the second columnar members and the third columnar members are respectively formed in a frusto-conical shape or a frusto-pyramidal shape which is tapered from a surface of the insulation substrate of the second substrate.

6. A display device according to claim 1, wherein the first columnar members, the second columnar members and the third columnar members are respectively tapered form a surface of the insulation substrate of the second substrate, and the top portions of the respective columnar members have a convex curved surface.

* * * * *